(12) United States Patent
Su et al.

(10) Patent No.: US 8,088,507 B2
(45) Date of Patent: Jan. 3, 2012

(54) PORTABLE ELECTRONIC DEVICE HAVING SECURED BATTERY

(75) Inventors: Fei-Ming Su, Changhua Hsien (TW); Jia-Hao Tseng, Nantou (TW)

(73) Assignees: Universal Scientific Industrial (Shanghai) Co., Ltd., Shanghai (CN); Universal Global Scientific Industrial Co., Ltd., Nantou (TW)

( * ) Notice: Subject to any disclaimer, the term of this patent is extended or adjusted under 35 U.S.C. 154(b) by 922 days.

(21) Appl. No.: 12/110,051

(22) Filed: Apr. 25, 2008

(65) Prior Publication Data

US 2009/0270136 A1   Oct. 29, 2009

(51) Int. Cl.
*H01M 2/10* (2006.01)
*H05K 5/00* (2006.01)
*H05K 7/00* (2006.01)

(52) U.S. Cl. ............ 429/97; 429/100; 361/679.01

(58) Field of Classification Search ............ 429/96–100; 361/679.01
See application file for complete search history.

(56) References Cited

U.S. PATENT DOCUMENTS

| | | | | |
|---|---|---|---|---|
| 5,140,138 A | * | 8/1992 | Tanaka | 235/1 D |
| 6,455,188 B1 | * | 9/2002 | McKay et al. | 429/97 |
| 6,710,576 B1 | * | 3/2004 | Kaufman et al. | 320/107 |
| 6,730,432 B1 | * | 5/2004 | Grosfeld et al. | 429/97 |
| 2006/0154136 A1 | * | 7/2006 | Ge et al. | 429/97 |

* cited by examiner

*Primary Examiner* — Basia Ridley
*Assistant Examiner* — Jonathan G Leong
(74) *Attorney, Agent, or Firm* — Christie, Parker & Hale, LLP

(57) ABSTRACT

A portable electronic device includes a main casing having a battery-receiving groove for receiving a battery therein, and two aligned resilient abutting tongues flanking the battery-receiving groove. A cover is mounted removably on the main casing for covering the battery-receiving groove. Two anchoring members are mounted rotatably on the cover, extends into the main casing, and is operable so as to switch between a releasing state, where the abutting tongues are spaced respectively apart from the battery, and a clamping state, where the abutting tongues are pressed respectively against the battery.

6 Claims, 7 Drawing Sheets

PORTABLE ELECTRONIC DEVICE HAVING SECURED BATTERY

BACKGROUND OF THE INVENTION

1. Field of the Invention

The invention relates to portable electronic device, more particularly to a portable electronic device having a housing device for receiving a battery.

2. Description of the Related Art

FIG. 1 illustrates a conventional portable electronic device 10, such as a mobile phone, that includes a main housing 11 formed with a battery-receiving groove 111 for receiving a battery 12 therein, and a cover 13 mounted detachably on the main housing 11 for covering the battery-receiving groove 111.

In such a configuration, although the cover 13 is anchored to the main housing 11 by engagement between two positioning blocks 131 of the cover 13 and two positioning holes 112 in the main housing 11, the battery 12 cannot be positioned effectively in the battery-receiving groove 111. As a result, electrical disconnection between the battery 12 and an electrical contact (not shown) may occur when the conventional portable electronic device 10 is subjected to impact. Therefore, the conventional electronic device 10 cannot ensure stable power supply from the battery 12.

SUMMARY OF THE INVENTION

Therefore, the object of the present invention is to provide a portable electronic device having a housing device that can securely position a battery therein.

According to the present invention, a portable electronic device comprises:

a battery;

a main casing having a battery-receiving groove for receiving the battery therein, and two aligned resilient abutting tongues flanking the battery-receiving groove;

a cover mounted removably on the main casing for covering the battery-receiving groove; and two anchoring members mounted rotatably on the cover, extending into the main casing and operable so as to switch between a releasing state, where the abutting tongues are spaced respectively apart from the battery, and a clamping state, where the abutting tongues are pressed respectively against the battery.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
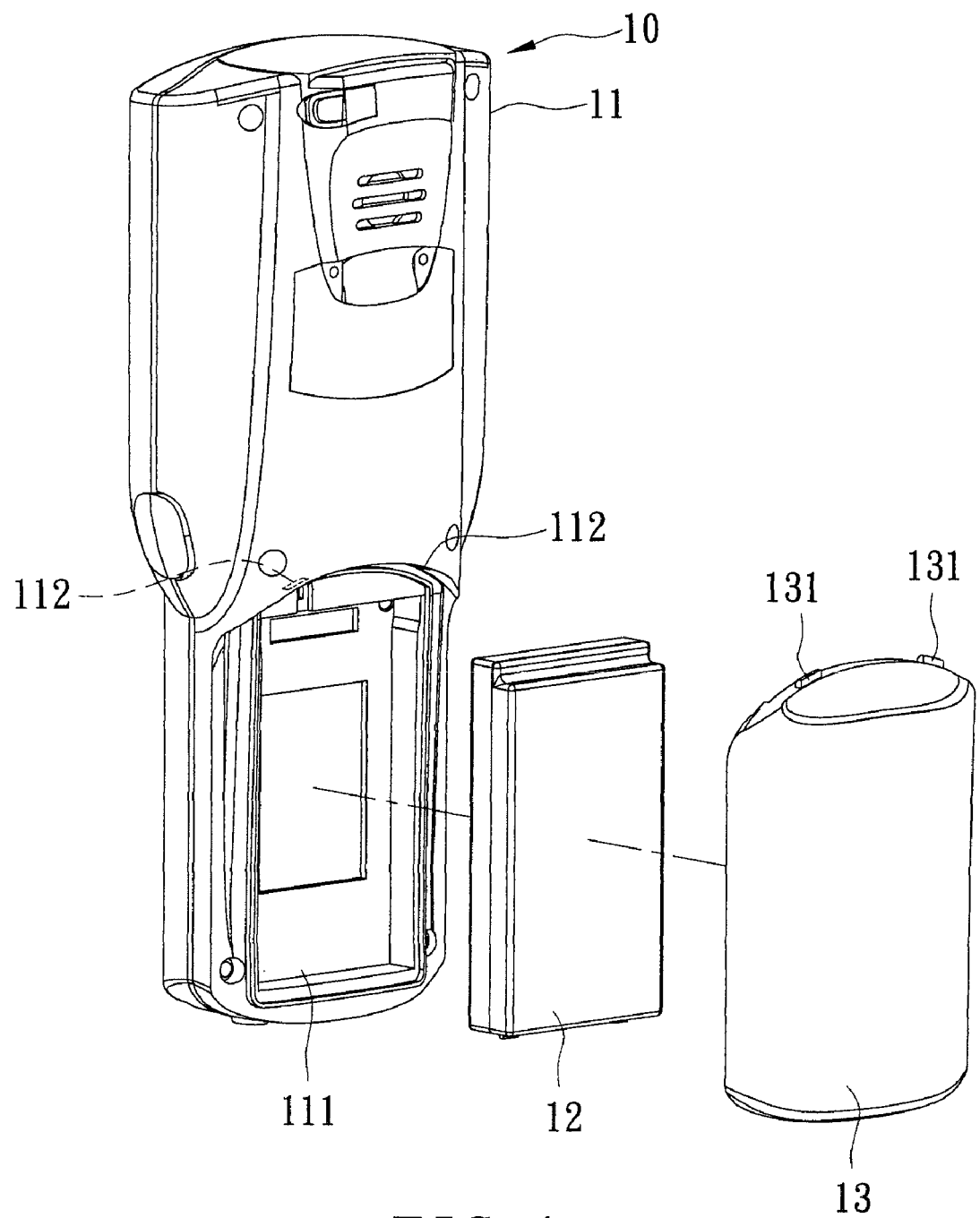
FIG. 1 is an exploded perspective view of a conventional portable electronic device.
Figure 2:
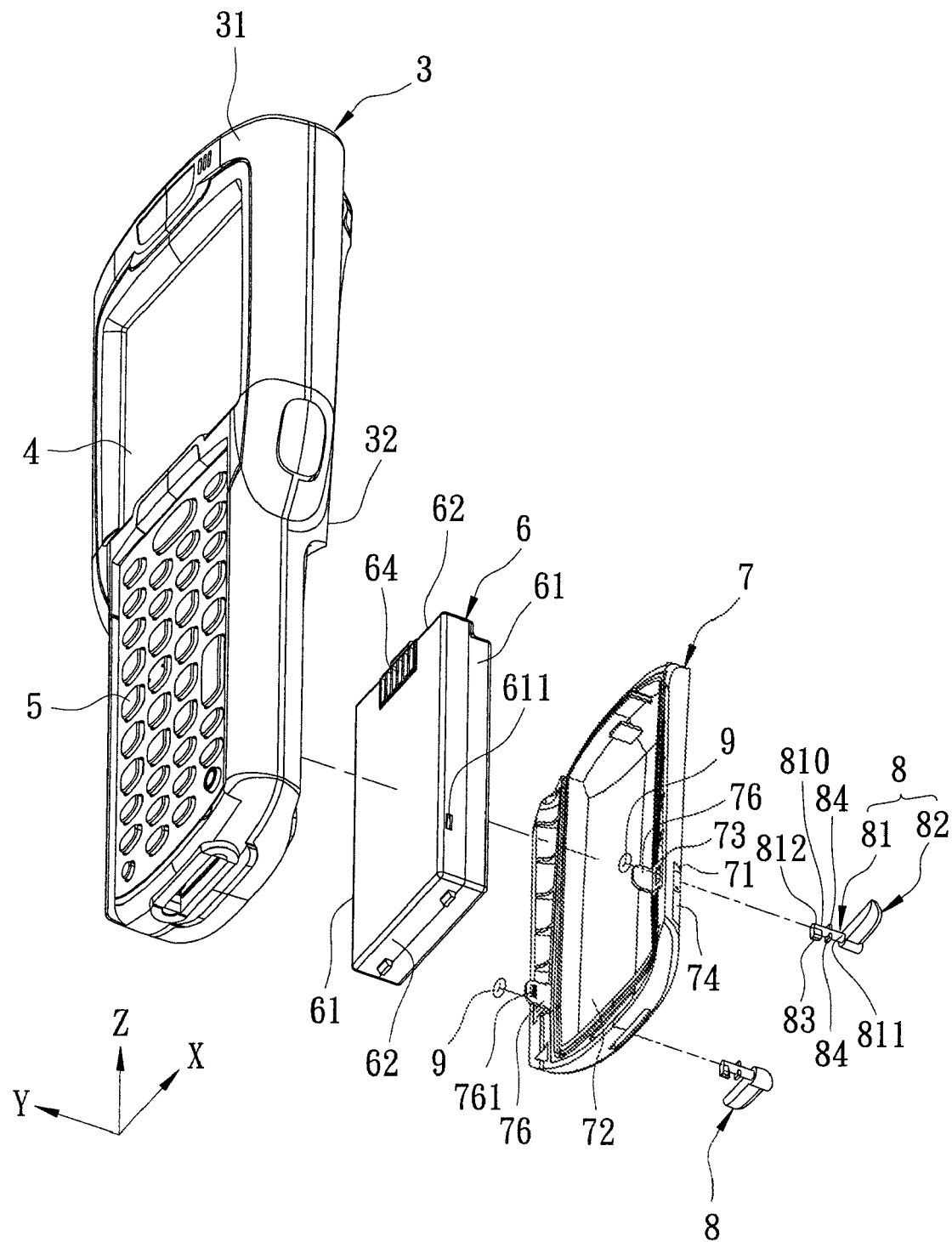
FIG. 2 is an exploded front perspective view showing the preferred embodiment of a portable electronic device according to the present invention.
Figure 3:
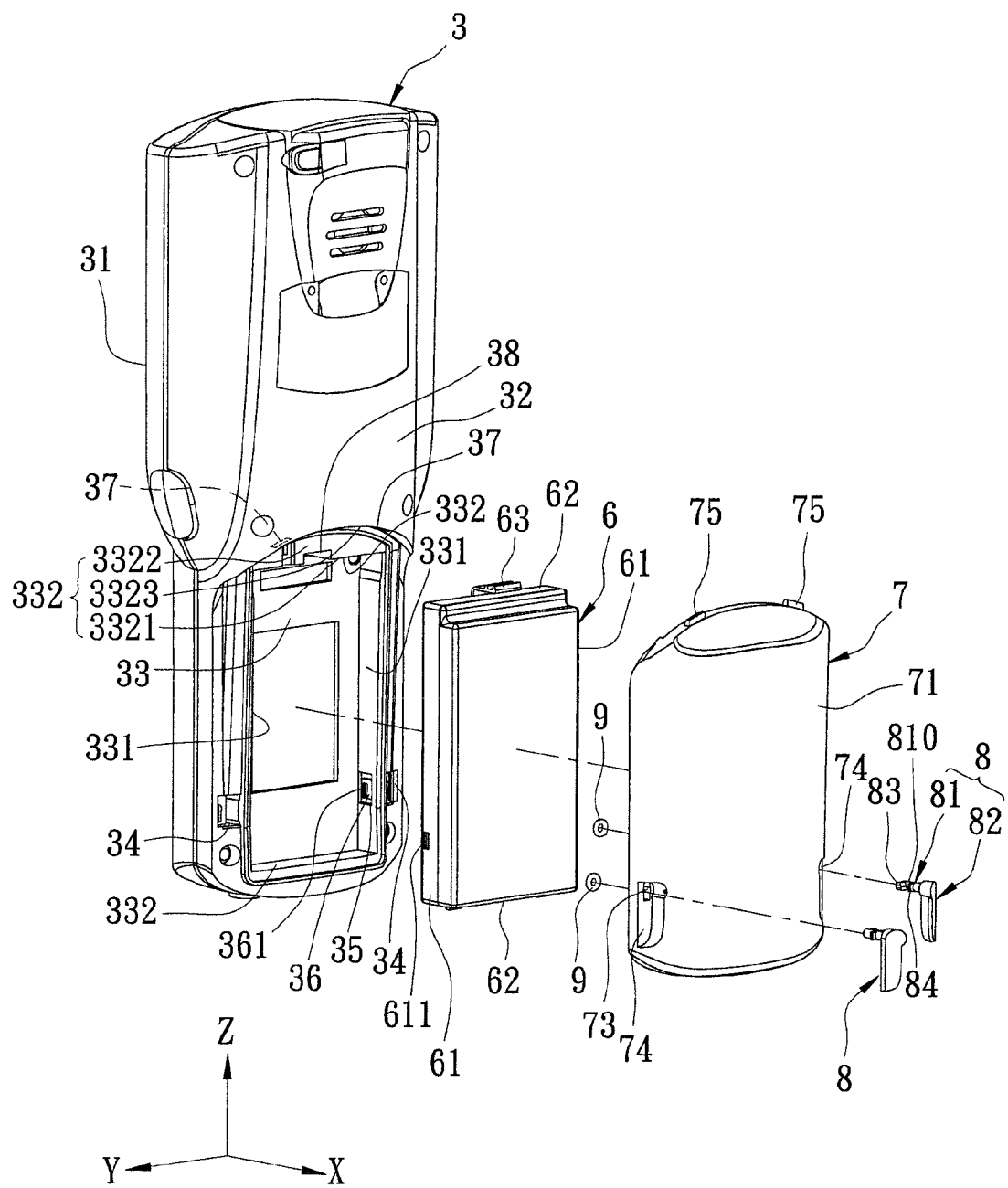
FIG. 3 is an exploded rear perspective view showing the preferred embodiment.
Figure 4:
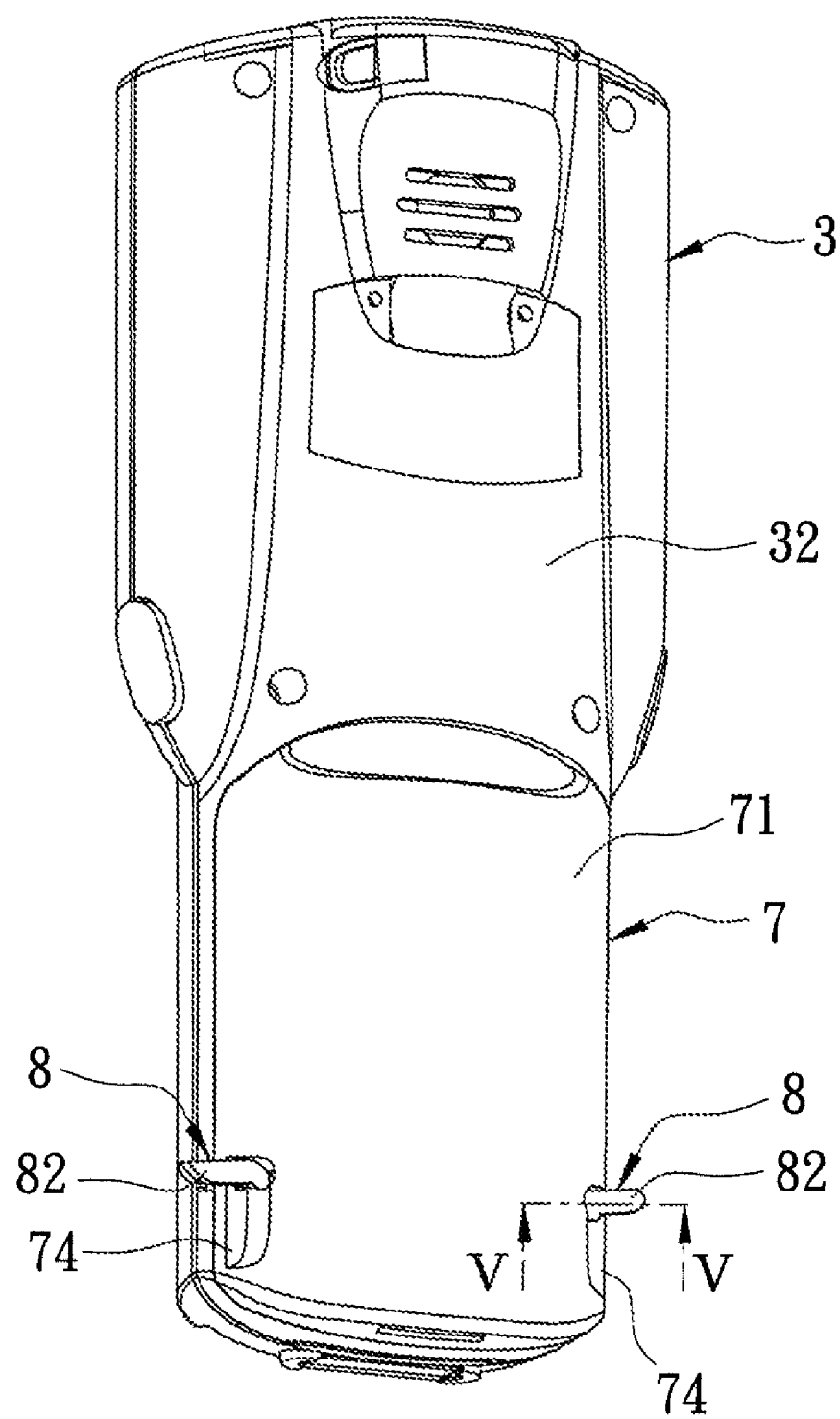
FIG. 4 is an assembled rear perspective view showing the preferred embodiment when two anchoring members are in a releasing state.

Referring to FIGS. 2 and 3, the preferred embodiment of a portable electronic device according to the present invention is shown to include a battery 6, a main casing 3, a cover 7, and two anchoring members. In this embodiment, the portable electronic device is an industrial personal digital assistant (PDA).

The battery 6 has two first side surfaces 61 opposite to each other in a first direction (Y), and two second side surfaces 62 opposite to each other in a second direction (Z) perpendicular to the first direction (Y).

Figure 5:
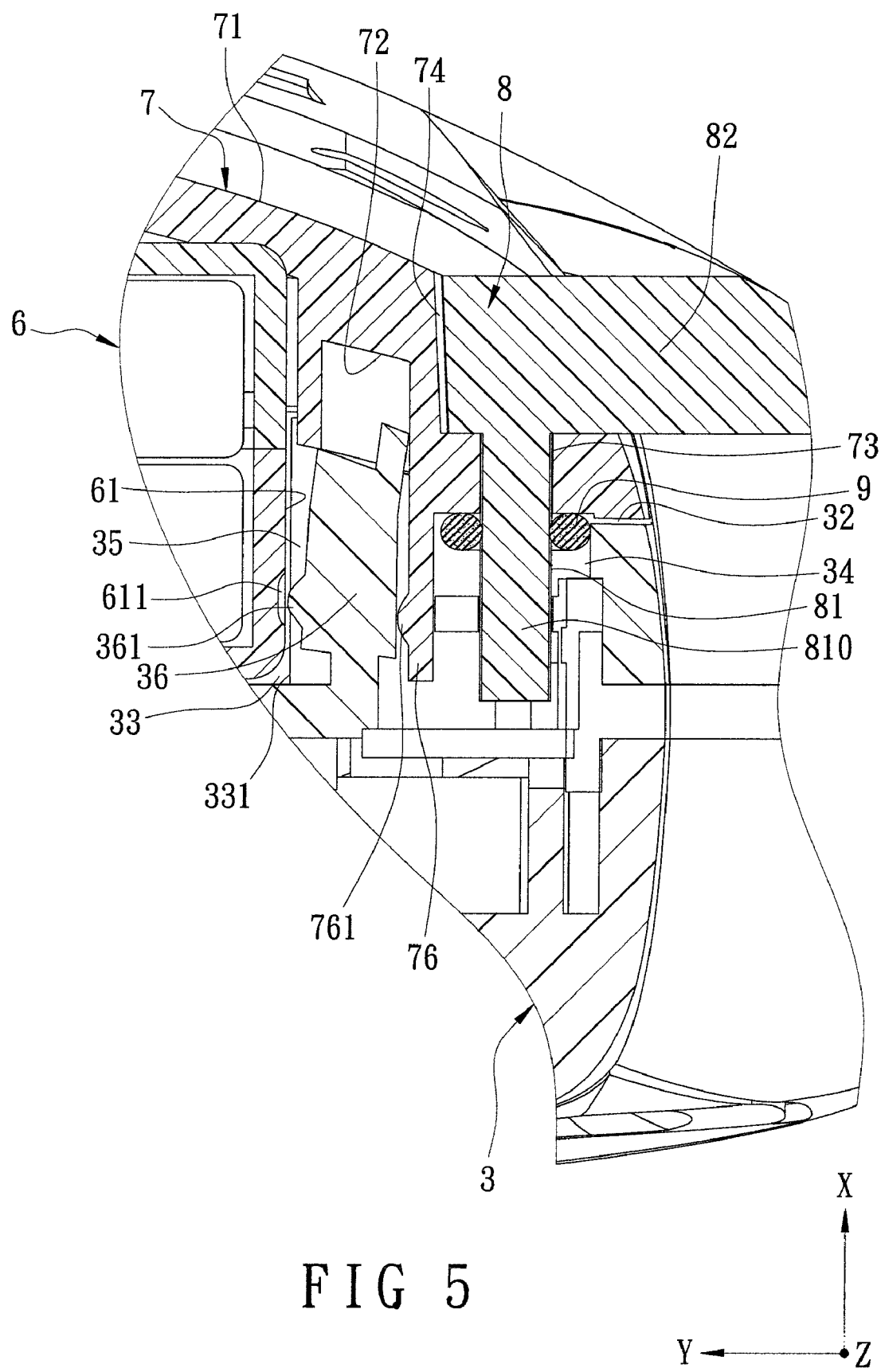
FIG. 5 is a fragmentary schematic sectional view of FIG. 4 taken along line V-V.
Figure 6:
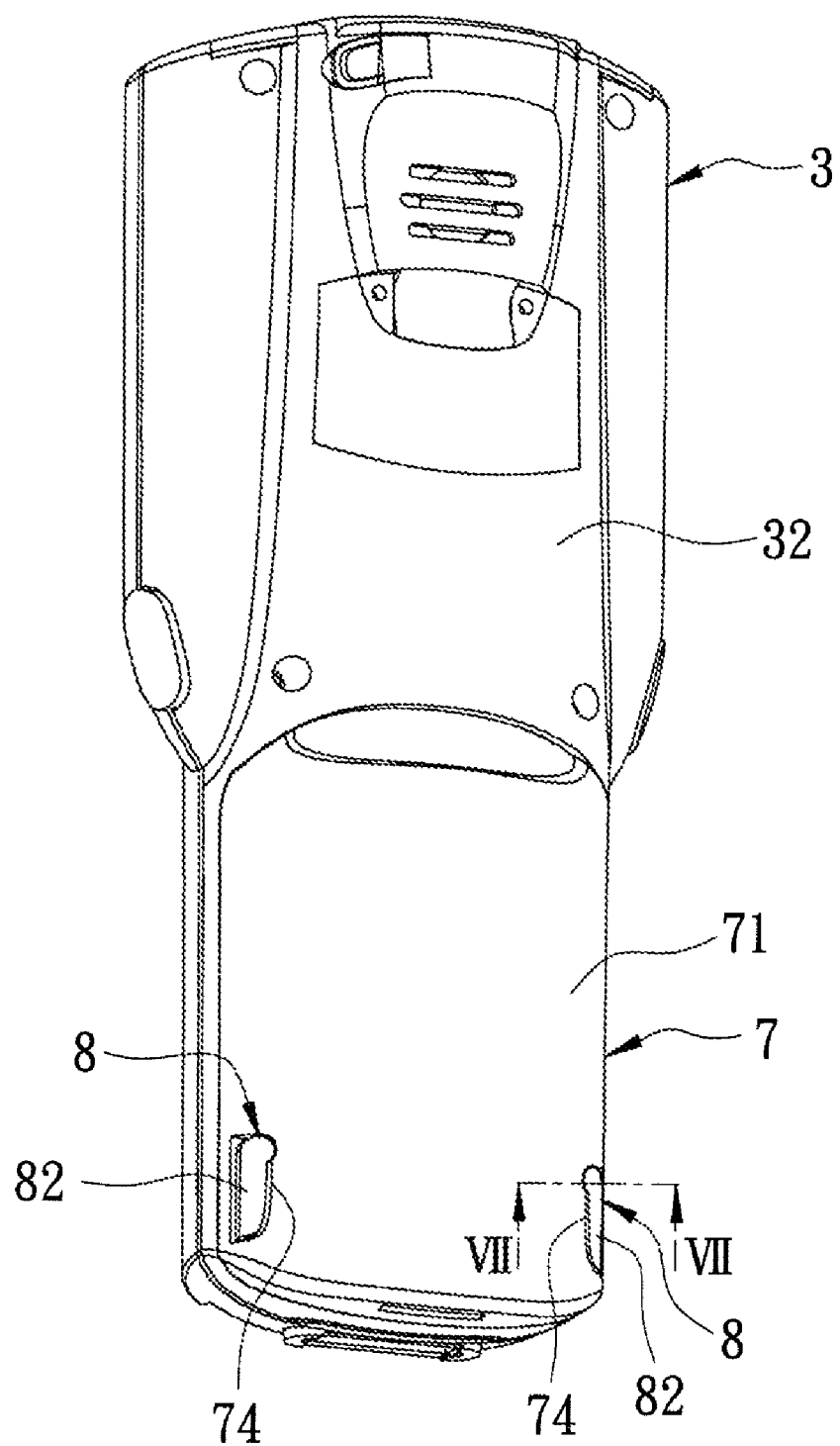
FIG. 6 is an assembled rear perspective view showing the preferred embodiment when the anchoring members are in a clamping state.

The main casing 3 has first and second side surfaces 31, 32 opposite to each other in a third direction (X) perpendicular to the first and second directions (Y, Z). In this embodiment, the first and second side surfaces 31, 32 can be respectively regarded as front and rear side surfaces. A display 4 and a keypad 5 are mounted on the first side surface 31 of the main casing 3, as shown in FIG. 2. The second side surface 32 of the main casing 3 is formed with a battery-receiving groove 33 for receiving the battery 6 therein, and two aligned resilient abutting tongues 36 flanking the battery-receiving groove 33. In this embodiment, as shown in FIG. 3, the battery-receiving groove 33 is defined by two first inner sidewall surfaces 331 opposite to each other in the first direction (Y), and two second inner sidewall surfaces 332 opposite to each other in the second direction (Z). The second side surface 32 of the main casing 3 is further formed with the two recesses 34 disposed respectively adjacent to the first inner sidewall surfaces 331. Each first inner sidewall surface 331 is formed with a via hole 35 in spatial communication with the battery-receiving groove 33 and a corresponding one of the recesses 34 (see FIG. 5). The abutting tongues 36 (only one is shown in FIG. 5) extend respectively into the via holes 35 in the first inner sidewall surfaces 331 in the third direction (X). Each abutting tongue 36 has a protrusion 361 extending toward the battery-receiving groove 33. In this embodiment, an upper one of the second inner sidewall surfaces 332 has a first surface portion 3321 perpendicular to the second side surface 32, a second surface portion 3322 connected to and perpendicular to the first surface portion 3321, and formed with a slot 38 disposed adjacent to the first surface portion 3321, in spatial communication with the battery-receiving groove 33 and engaging detachably a resilient anchoring plate 63 that extends from a top one of the second side surfaces 62 of the battery 6 (see FIG. 3), and a third surface portion 3323 interconnecting the second surface portion 3322 and the second side surface 32.

The cover 7 is mounted removably on the second side surface 32 of the main casing 3 for covering the battery-receiving groove 33. In this embodiment, the cover 7 has opposite inner and outer surfaces 72, 71, and two through holes 73 extending from the inner surface 72 to the outer surface 71 in the third direction (X) and aligned respectively with the recesses 34. The outer surface 71 is formed with two receiving grooves 74 in spatial communication with the through holes 73, as shown in FIGS. 3 and 5. The cover 7 further has two positioning blocks 75 extending from the outer surface 71 in the second direction (Z) and engaging respectively two positioning holes 37 formed in the third surface portion 3323 of the upper one of the second inner sidewall surfaces 332 of the main casing 3.

Figure 7:
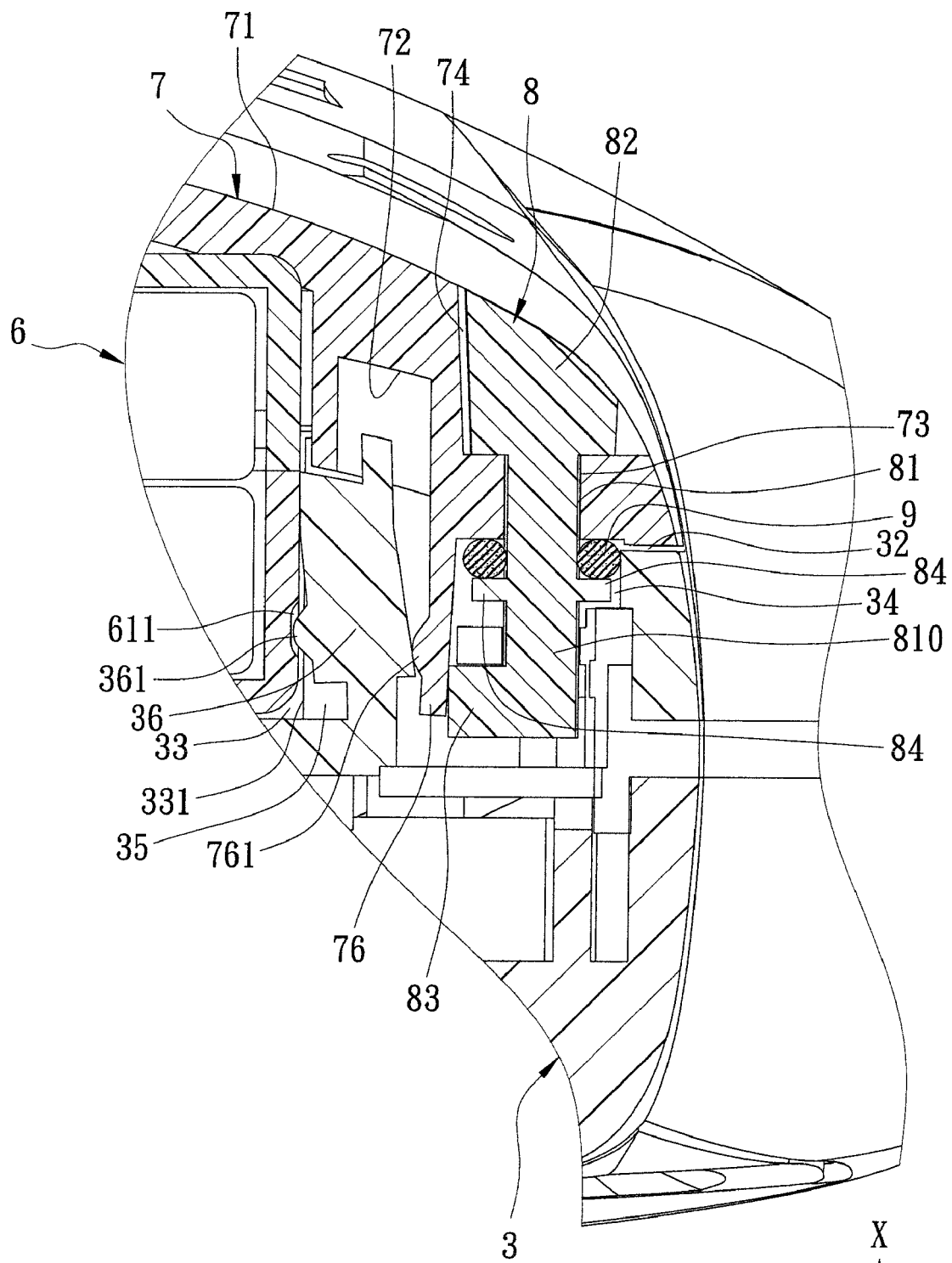
FIG. 7 is a fragmentary schematic sectional view of FIG. 6 taken along line VII-VII.

Referring further to FIGS. 4 to 7, the anchoring members are mounted rotatably on the cover 7, extend into the main casing 3, and are operable so as to switch between a releasing state, where the abutting tongues 36 are spaced respectively apart from the first side surfaces 61 of the battery 6, as shown in FIG. 5, and a clamping state, where the abutting tongues 36 are pressed respectively against the first side surfaces 61 of the battery 6, as shown in FIG. 7. In this embodiment, each anchoring member includes an L-shaped rod 8, and a resilient washer 9. For each anchoring member, the L-shaped rod 8 has an insertion rod portion 81 extending through a corresponding one of the through holes 73 in the cover 7 and into a corresponding of the recesses 34 in the main casing 3, and an operating rod portion 82 connected to one end 811 of the insertion rod portion 81 and disposed rotatably on the outer surface 71 of the cover 7. Also, for each anchoring member, the insertion rod portion 81 of the L-shaped rod 8 includes a rod body 810 perpendicular to the operating rod portion 82 and having a free end 812 and opposite radially extending stopping protrusions 84 disposed adjacent to the operating rod portion 82, and a pushing block 83 extending radially from the free end 812 and perpendicular to the rod body 810 and the operating rod portion 82. For each anchoring member, the washer 9 is sleeved on the rod body 810 of the insertion rod portion 81 of the L-shaped rod 8, and is disposed between and abuts against the stopping protrusions 84 and the inner surface 72 of the cover 7, as best shown in FIG. 7. Thus, each anchoring member is rotatable relative to the cover 7 about an axis of the rod body 810 of the insertion rod portion 81 of the L-shaped rod 8 thereof.

In this embodiment, as shown in FIGS. 2 and 5, the cover 7 further has two resilient extension plates 76 extending from the inner surface 72 of the cover 7 in the third direction (X) into the recesses 34 in the main casing 3, respectively. Each extension plate 76 is disposed between the insertion rod portion 81 of the L-shaped rod 8 of a corresponding one of the anchoring members and a corresponding one of the abutting tongues 36, and has a protrusion 761 extending toward the corresponding one of the abutting tongues 36.

In use, as shown in FIG. 7, when the anchoring members are operated in the clamping state, the extension plates 76 of the cover 7 are pushed respectively by the pushing blocks 83 of the insertion rod portion 81 of the L-shaped rods 8 of the anchoring members to pivot toward the via holes 35 in the first inner sidewall surfaces 331 of the main casing 3 such that the abutting tongues 36 are respectively pushed and moved by the protrusions 761 of the extension plates 76 to press against the first side surfaces 61 of the battery 6. At the same time, the protrusion 361 of each abutting tongue 36 engages an engaging groove 611 formed in a corresponding one of the first side surfaces 61 of the battery 6 (see FIG. 7), and the operating rod portions 82 of the L-shaped rods 8 of the anchoring members are received respectively in the receiving grooves 74 in the outer surface 71 of the cover 7 (see FIG. 6).

It is noted that, in other embodiments, the extension plates 76 can be omitted. In other words, the abutting tongues 36 can be pushed directly and respectively by the pushing blocks 83 of the insertion rod portions 81 of the L-shaped rods 8 of the anchoring members to press against the first side surfaces 61 of the battery 6 when the anchoring members are operated in the clamping state.

In sum, due to the pressing of the abutting tongues 36 against the battery 6 and engagement between the anchoring plate 63 of the battery 6 and the slot 38 in the main casing 3, the battery 6 can be securely positioned in the housing device such that electrical connection between electrical contacts 64 of the battery 6 and electrical terminals (not shown) in the main casing 3 can be ensured. Therefore, the portable electronic device of the present invention can ensure stable power supply from the battery 6.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A portable electronic device comprising:
    a battery;
    a main casing having a battery-receiving groove for receiving said battery therein, and two aligned resilient abutting tongues flanking said battery-receiving groove;
    a cover mounted removably on said main casing for covering said battery-receiving groove; and
    two anchoring members mounted rotatably on said cover, extending into said main casing and operable so as to switch between a releasing state, where said abutting tongues are spaced respectively apart from said battery, and a clamping state, where said abutting tongues are pressed respectively against said battery,
    wherein:
    said battery-receiving groove in said main casing is defined by two inner sidewall surfaces opposite to each other, said main casing further having two recesses disposed respectively adjacent to said inner sidewall surfaces, each of said inner sidewall surfaces being formed with a via hole in spatial communication with said battery-receiving groove and a corresponding one of said recesses, said abutting tongues extending respectively into said via holes in said inner sidewall surfaces;
    said cover has two through holes aligned respectively with said recesses;
    each of said anchoring members includes an insertion rod portion extending through a corresponding one of said through holes in said cover and into a corresponding one of said recesses in said main casing, an operating rod portion connected to one end of said insertion rod portion and disposed rotatably on said cover, and a pushing block extending radially from said insertion rod portion and perpendicular to said insertion rod portion and said operating rod portion of the corresponding one of said anchoring members, each of said anchoring members being rotatable relative to said cover about an axis of said insertion rod portion;
    said cover further has two resilient extension plates extending from said cover into said recesses in said main casing, respectively, each of said extension plates being disposed between said insertion rod portion of a corresponding one of said anchoring members and a corresponding one of said abutting tongues; and
    when said anchoring members are operated in the clamping state, said extension plates of said cover are pushed respectively by said pushing blocks of said anchoring members to pivot toward said via holes in said main casing such that said abutting tongues are respectively pushed and moved by said extension plates to press against said battery.

2. The portable electronic device as claimed in claim 1, wherein:
    said battery has opposite engaging grooves; and each of said abutting tongues has a protrusion extending toward said battery-receiving groove, said protrusions of said abutting tongues engaging respectively said engaging grooves in said battery when said anchoring members are operated in the clamping state.

3. The portable electronic device as claimed in claim 1, wherein said cover is formed with two receiving grooves in spatial communication with said through holes, respectively, for receiving respectively said operating rod portions of said anchoring members therein when said anchoring members are operated in the clamping state.

4. The portable electronic device as claimed in claim 1, wherein said insertion rod portion of each of said anchoring members further has a radially extending stopping protrusion disposed adjacent to said operating rod portion of a corresponding one of said anchoring members, each of said anchoring members further including, a washer sleeved on said insertion rod portion of the corresponding one of said anchoring members, and disposed between and abutting against said stopping protrusion of said insertion rod portion of the corresponding one of said anchoring members and said cover.

5. The portable electronic device as claimed in claim 1, wherein:
   said battery has a resilient anchoring plate; and
   said main casing further has a slot in spatial communication with said battery-receiving groove and engaging detachably the anchoring plate of said battery.

6. The portable electronic device as claimed in claim 1, wherein:
   said cover further has a positioning block; and
   said main casing is further formed with a positioning hole engaging respectively said positioning block of said cover.

* * * * *